United States Patent
Davis et al.

(10) Patent No.: US 9,995,097 B2
(45) Date of Patent: *Jun. 12, 2018

(54) DIVERTING FLOW IN A KILL MUD CIRCULATION SYSTEM TO REGULATE KILL MUD PRESSURE

(71) Applicant: Halliburton Energy Services, Inc., Houston, TX (US)

(72) Inventors: Nancy Suzan Davis, Irving, TX (US); Cody Neal Butler, Dallas, TX (US)

(73) Assignee: Halliburton Energy Services, Inc., Houston, TX (US)

(*) Notice: Subject to any disclaimer, the term of this patent is extended or adjusted under 35 U.S.C. 154(b) by 264 days.

This patent is subject to a terminal disclaimer.

(21) Appl. No.: 14/752,366

(22) Filed: Jun. 26, 2015

(65) Prior Publication Data
US 2015/0354299 A1 Dec. 10, 2015

Related U.S. Application Data

(63) Continuation of application No. 14/236,061, filed as application No. PCT/US2013/031003 on Mar. 13, 2013, now Pat. No. 9,068,419.

(51) Int. Cl.
*G01V 1/40* (2006.01)
*E21B 21/08* (2006.01)
(Continued)

(52) U.S. Cl.
CPC .............. *E21B 21/08* (2013.01); *E21B 21/10* (2013.01); *E21B 41/0092* (2013.01);
(Continued)

(58) Field of Classification Search
CPC ...... E21B 21/08; E21B 21/10; E21B 41/0092; E21B 47/06; E21B 47/10; G05B 15/02; G05D 16/20
(Continued)

(56) References Cited

U.S. PATENT DOCUMENTS 3,338,319 A 8/1967 Griffin, III
3,552,502 A 1/1971 Wilson
(Continued)

FOREIGN PATENT DOCUMENTS

CN 101446191 A 6/2009
CN 201593387 U 9/2010
(Continued)

OTHER PUBLICATIONS

PCT International Preliminary Report on Patentability, PCT/US2013/031003, dated Sep. 24, 2015, 8 pages.
(Continued)

*Primary Examiner* — Toan Le
*Assistant Examiner* — Xiuquin Sun
(74) *Attorney, Agent, or Firm* — John Wustenberg; Parker Justiss, P.C.

(57) ABSTRACT

Killing a well by diverting flow in a drilling fluid circulation system to maintain kill mud pressure in a discharge piping during the well kill operation. It is determined that a target pressure of the kill mud in the discharge piping is not satisfied by a pressure of the kill mud discharged by a pump into the discharge piping. In response, a pressure of the kill mud is adjusted by at least partially opening a pressure control device to release kill mud into a bypass piping.

16 Claims, 3 Drawing Sheets

(51) Int. Cl.
*E21B 47/06* (2012.01)
*E21B 47/10* (2012.01)
*G05B 15/02* (2006.01)
*E21B 41/00* (2006.01)
*G05D 16/20* (2006.01)
*E21B 21/10* (2006.01)

(52) U.S. Cl.
CPC .............. *E21B 47/06* (2013.01); *E21B 47/10* (2013.01); *G05B 15/02* (2013.01); *G05D 16/20* (2013.01)

(58) Field of Classification Search
USPC ............................................................ 702/9
See application file for complete search history.

(56) References Cited

U.S. PATENT DOCUMENTS

| | | | |
|---|---|---|---|
| 6,484,816 | B1 | 11/2002 | Koederitz |
| 6,755,261 | B2 | 6/2004 | Koederitz |
| RE38,567 | E | 8/2004 | Gruenhagen |
| 6,904,981 | B2 | 6/2005 | Van Riet |
| 6,920,085 | B2 | 7/2005 | Finke et al. |
| 8,042,572 | B2 | 10/2011 | Winnacker et al. |
| 8,281,875 | B2 | 10/2012 | Lovorn et al. |
| 9,019,118 | B2 | 4/2015 | Milne et al. |
| 9,068,419 | B2 * | 6/2015 | Davis ................... E21B 41/0092 |
| 2001/0050186 | A1 | 12/2001 | Wilson et al. |
| 2005/0092523 | A1 | 5/2005 | McCaskill et al. |
| 2007/0151763 | A1 | 7/2007 | Reitsma et al. |
| 2008/0078586 | A1 | 4/2008 | Tettleton et al. |
| 2008/0295589 | A1 | 12/2008 | Cour |
| 2009/0194330 | A1 | 8/2009 | Gray |
| 2009/0272580 | A1 | 11/2009 | Dolman et al. |
| 2011/0139506 | A1 * | 6/2011 | Lovorn .................. E21B 21/10 175/25 |
| 2012/0048620 | A1 | 3/2012 | Hopwood et al. |
| 2012/0285744 | A1 | 11/2012 | Bernard |

FOREIGN PATENT DOCUMENTS

| | | |
|---|---|---|
| CN | 102758619 A | 10/2012 |
| GB | 2334052 A | 11/1999 |
| WO | 2010071656 A1 | 6/2010 |
| WO | 2012158155 A1 | 11/2012 |
| WO | 2014007797 A1 | 1/2014 |

OTHER PUBLICATIONS

Patent Examination Report No. 1, Australian Application No. 2013382094, dated May 24, 2016, 2 pages.

International Search Report and Written Opinion of the International Searching Authority issued in International Application No. PCT/US2013/031003 dated Nov. 11, 2013 11 pages.

International Search Report and Written Opinion of the International Searching Authority issued in in International Application No. PCT/IB2012/057842 dated Sep. 26, 2013, 11 pages.

Cayeux et al., "Automation of Mud-Pump Management: Application to Drilling Operations in the North Sea," International Research Institute of Stavanger, SPE Drilling & Completion, vol. 26.1, Mar. 2011, pp. 41-51.

* cited by examiner

DIVERTING FLOW IN A KILL MUD CIRCULATION SYSTEM TO REGULATE KILL MUD PRESSURE

This application is a continuation of and claims the benefit of priority to U.S. application Ser. No. 14/236,061, filed Jan. 29, 2014, which is a U.S. National Stage Application of International Application No. PCT/US/2013/031003, filed Mar. 13, 2013.

TECHNICAL FIELD

This disclosure relates to circulating drilling fluid through surface pumps and piping and in well bores.

BACKGROUND

In well bore drilling situations that use a drilling rig, a drilling fluid circulation system circulates (or pumps) drilling fluid (for example, drilling mud) with one or more mud pumps. For example, the drilling fluid circulation system can move drilling mud down into the well bore through special pipe (referred to in the art as drill pipe), and drill collars which are connected to the drill sting. The fluid exits through ports (jets) in the drill bit, picking up cuttings and carrying the cuttings up the annulus of the well bore. The mud pump can take suction from mud tanks and can pump mud out discharge piping, up the stand pipe, through rotary hoses, through Kelly or top drive unit, and into a central bore of the drill pipe, drill collars, and bit. Mud and cuttings return to the surface up annulus. At the surface, the mud and cuttings leave the well bore through an outlet, and can be sent to a cuttings removal system via mud return line. At the end of the return lines, mud and cutting can be flowed onto a vibrating screen known in the art as a Shale Shaker. Finer solids can be removed by a sand trap. The mud may be treated with chemicals stored in a chemical tank and can then be provided into the mud tank, where the process can be repeated.

The drilling fluid circulation system delivers large volumes of mud flow under pressure for drilling rig operations. For example, the circulation system can deliver the mud to the drill stem to flow down the string of drill pipe and out through the drill bit appended to the lower end of the drill stem. In addition to cooling the drill bit, the mud hydraulically washes away the face of the well bore through a set of openings in the drill bit. The mud additionally washes away debris, rock chips, and cuttings, which are generated as the drill bit advances. The circulation system can flow the mud in an annular space on the outside of the drill stem and on the interior of the open hole formed by the drilling process. In this manner, the circulation system can flow the mud through the drill bit and out of the well bore.

The mud flows through the drill stem and the annular space at a sufficient velocity to move debris, chips and cuttings, which are heavier than the mud, to the surface. The velocity of the mud should also be sufficient to cool the drill bit. The wellhead pressures at the pump are sufficiently high to flow the mud at the desired velocity and also to overcome substantial flow pressure resistance along the flow path. In some situations, the circulation system can flow the mud through the drill bit and the well bore at high volumetric flow rates (for example, 500 to 1,000 gallons per minute) and at pressures as high as 5,000 PSI. If drilling fluid flows into the well bore and up the annulus or inside the drill pipe due to an imbalance in drilling mud pressure, then a phenomenon known as kick can result. If the well is not shut in, a kick can escalate into a blowout when the formation fluids reach the surface.

DESCRIPTION OF DRAWINGS

Like reference numbers and designations in the various drawings indicate like elements.

DETAILED DESCRIPTION

Figure 1:
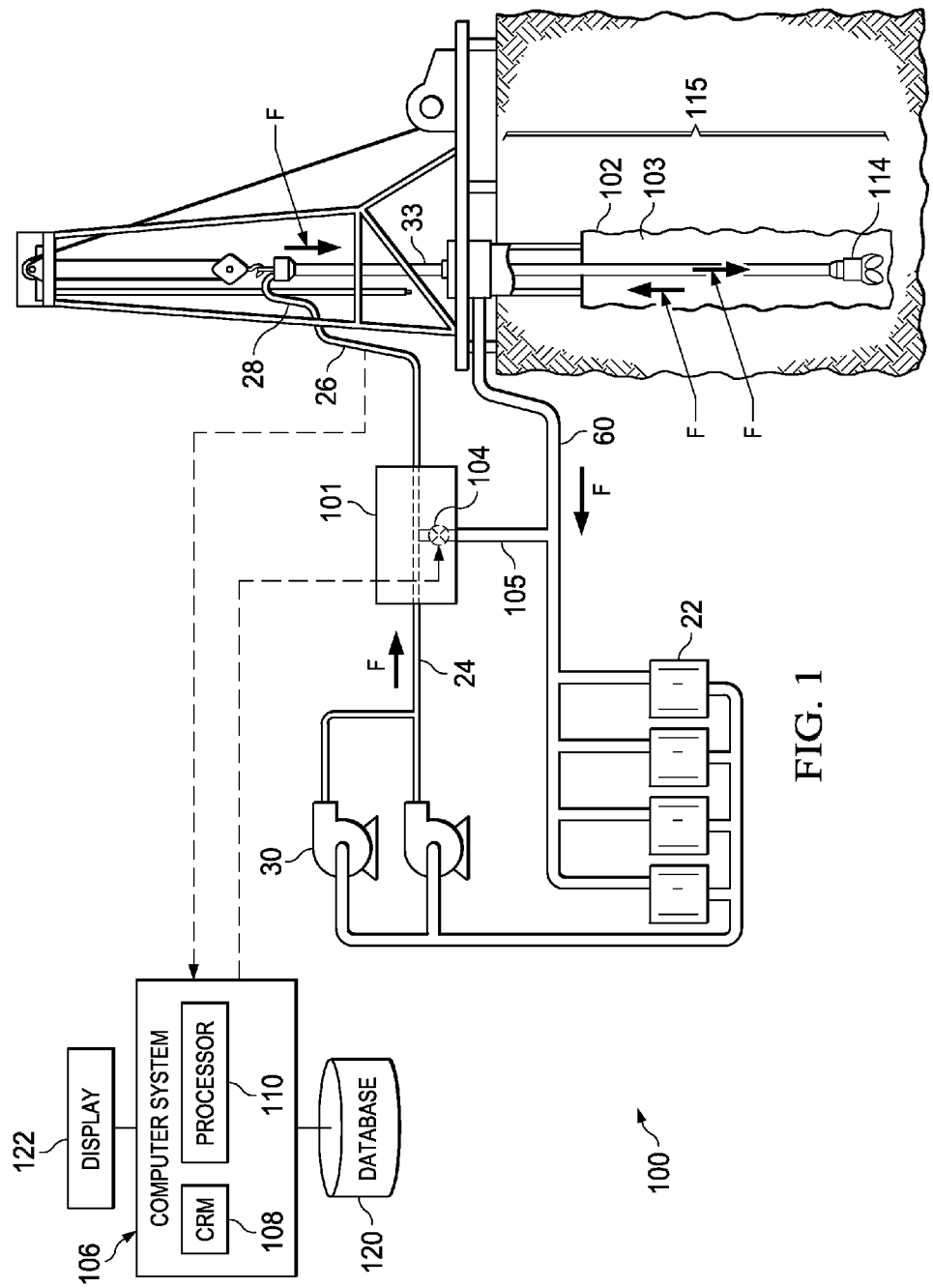
FIG. 1 is a schematic diagram of an example drilling fluid circulation system that includes a pressure control device.

This disclosure describes a system and method for diverting flow in a drilling fluid circulation system to regulate drilling fluid pressure. The system and the method described in this disclosure can be implemented as part of killing a well, i.e., to prevent an impending blowout on a well being drilled, for example, with constant bottom hole pressure. The Driller's method is an example method to kill the well in which the drilling fluid is circulated in the well twice. In the first circulation, the influx is circulated out with the original mud weight. Constant bottom hole pressure is maintained by holding circulating drill pipe pressure constant through the first circulation. If the original mud weight is insufficient to balance the formation pressure, the well is killed by circulating a heavier mud (kill mud) in a second circulation.

To hold constant bottom hole pressure during the second circulation, one of two methods can be implemented. In one method, the casing pressure is held constant while pumping kill mud from surface to bit, and drill pipe pressure is held constant thereafter until kill mud is observed returning to the surface. Alternatively, during second circulation, a drill pipe pressure schedule can be calculated and followed while pumping kill mud from surface to bit, and drill pipe pressure can thereafter be held constant.

The Wait and Weight method is another example method to kill the well in which the drilling fluid is circulated once. The influx is circulated out, and the kill mud is pumped in one circulation. While pumping kill mud from surface to bit, a drill pipe pressure schedule is calculated and followed. The drill pipe pressure is held constant thereafter until kill mud is observed returning to the surface.

The techniques described in this disclosure can be implemented to maintain the drilling fluid pressure in the piping through which the drilling fluid flows according to the drill pipe pressure schedule. For example, in the first and second circulations of the Driller's method, a computer-implemented method can be implemented to maintain drilling fluid pressure in discharge piping connected to an inlet of the well bore according to the drilling pipe pressure schedule by operating a pressure control device to automatically divert drilling fluid from the discharge piping, for example, to the mud pits, through bypass piping. Also, for example, in the circulation of the Wait and Weight method, the computer-implemented method can be implemented to automatically divert drilling fluid away from the discharge piping to maintain the drilling fluid pressure according to the drill pipe pressure schedule. In addition, the rates at which the drilling fluid is diverted can be measured and provided as input to a curve fit function (described below) to calculated flow rates at which the drilling fluid is diverted away from the discharge piping. The diverted flow rates can be used to calibrate the flow, for example, as an alternative to or in addition to using turbine flow meters. In this manner, the techniques described here can be implemented for well control for kicks/influx in which slow pump rates are obtained and recorded, and then used to calculate a diverted flow rate. The techniques can also be used to automate either the Driller's Method or the Wait and Weight Method (or both).

According to implementations of the techniques described herein, the drilling fluid can be automatically diverted to the mud pits instead of having the driller do so by modifying the injection flow rate. The Driller's method of well control can also be automated. Similarly, the Wait and Weight method of well control can also be automated. The method to achieve and record slow pump rates can be automated. The calculation of diverted flow rate can be improved.

FIG. 1 is a schematic diagram of an example drilling fluid circulation system 100 that includes a pressure control device 104. A well bore 102 can be drilled in the ground using a drill bit 114 attached to a downhole end of a drill string 115. The drill string 115 can be connected to discharge piping 24 from the discharge of at least one surface drilling fluid pump 30 to the Kelly or top drive system 33. The discharge piping 24, which connects the drilling fluid pump 30 and an inlet of the wellbore 102, can be, for example, a metal conduit that is part of a piping system mud pump discharge pressure pathway for drilling fluid (for example, drilling mud) to travel to the drill bit 114 attached to the downhole end of the drill string 115. The discharge piping 24 can include a drilling rig standpipe 26. In some implementations, the pressure control device 104 (for example, a rig pump diverter (RPD) manifold valve) can have an inlet connected to discharge piping 24 and have an outlet connected to a mud return line 60, for example, via bypass piping 105. The pump 30 is operable to discharge drilling fluid through the discharge piping 24 at a drilling fluid flow rate.

The drilling fluid circulation system 100 and the pressure control device 104 can be connected to a computer system 106 disposed at the surface to regulate drilling fluid pressure in the drilling fluid circulation system 100. The computer system 106 (for example, a desktop computer, a laptop computer, a tablet computer, a computer server system, and the like) can include a computer-readable medium 108 storing computer instructions executable by a processor 110 to divert flow in the drilling fluid circulation system 100 to regulate drilling fluid pressure.

In some implementations, the computer system 106 can receive pressure measurement signals representative of a pressure of the drilling fluid in the discharge piping 24. The computer system 106 can determine that a target pressure parameter of the drilling fluid in the discharge piping 24 is not satisfied. In response, the computer system 106 can adjust the pressure control device 104 to modify the pressure of the drilling fluid in the discharge piping to approach the target pressure parameter. To do so, the computer system 106 can at least partially open the pressure control device 104 and release drilling fluid into the bypass piping 105 at a selected flow rate. The computer system 106 can modify the drilling fluid flow rate in the discharge piping 24 based on the pressure represented by the pressure measurement signals and the selected flow rate in the bypass piping 105 such that the target pressure parameter of the drilling fluid in the discharge piping 24 is satisfied.

As used in this disclosure, the drilling rig standpipe 26 is intended to encompass any of the discharge piping 24 from the discharge of the mud pump 30 to the Kelly or top drive system 33 attached to the drill string 115, and can include any portion of the piping between the discharge and Kelly or top drive system 33. Therefore, it will be understood that the terms standpipe pressure and standpipe flow rate could be measured anywhere along the discharge piping 24 between the discharge of the mud pump 30 and the Kelly/top drive 33. The flow rate in the discharge piping 24 may alternatively or additionally be determined based on known flow rate methods for calculation of the output flow of mud pump 30 based on speed and cylinder displacement for a positive displacement mud pump.

The target pressure parameter in the discharge piping 24 can correspond to a drill pipe pressure schedule according to which the drilling fluid pump 30 discharges the drilling fluid through the discharge piping 30. For example, the drill pipe pressure schedule can be the schedule determined for the Driller's method or Wait and Weight method to kill the well. The computer system 106 can modify the drilling fluid flow rate in the discharge piping 24 based on the pressure represented by the pressure measurement signals and the selected flow rate to satisfy the drill pipe pressure schedule.

In some implementations, the computer system 106 can determine the selected flow rate at which the pressure control device 104 at least partially opens to release the drilling fluid. To do so, the computer system 106 can identify one or more of multiple data pairs stored on a computer-readable storage medium (for example, the database 120). Each data pair includes a flow rate of drilling fluid through the bypass piping 105 and a pressure in the bypass piping 105 at the flow rate. The computer system 106 can obtain the multiple data pairs stored on the database 120 by measuring multiple flow rates of drilling fluid flowing through the bypass piping 105 and measuring multiple respective pressures in the bypass piping 105, each pressure measured for a corresponding flow rate. The computer system 106 can then store the measured multiple flow rates and pressures on the database 120 as the multiple data pairs.

The computer system 106 can provide the flow rate of drilling fluid through the bypass piping and the pressure in the bypass piping included in each identified data pair as an input to a curve fit function. The computer system 106 can execute the curve fit function to determine the selected flow rate at which the pressure control device 104 is to be at least partially opened to release the drilling fluid.

An example of the curve fit function that can be implemented to calculate the diverted flow rate from the discharge pressure is provided below as pseudo-code.

```
//////////////////////////////////////////////////////
//              Calculations Begin         //
//////////////////////////////////////////////////////
//SPP below which flow will be set to zero in PSIG .. change with each well
SPPWhereFlowIsEffectivelyZero = 300
//power fit equation parameters .. change with each well get from matlab
C0 = 0.1836
C1 = 1.8093
C2 = 256.0744
// operator don't change below here
PastFlowRateGPM = 0
WHILE(1) // Run Forever
    RTIN__GBRPDData(1)
    RTIN__TimeSDLFast(1)
```

-continued

```
//      if we are bypassing the flowmeter data and we are in a connection
        IF ( GBRPDStep != 0)
//              we will calculate the flow based on SPP
                IF (GBSPP > SPPWhereFlowIsEffectivelyZero )
                        BypassFlowOut =
                        EXPONENT((LOGN((GBSPP-C2)/C0))/C1)
                        IF (BypassFlowOut < 0)
                                BypassFlowOut = 0
                        END
                        IF (BypassFlowOut > 300)
                                BypassFlowOut = PastFlowRateGPM
                        END
                ELSE
                        BypassFlowOut = 0
                END
        ELSE
                BypassFlowOut = BypassFlowIn
                IF (BypassFlowIn < 0)
                        BypassFlowOut = 0
                END
        END
        PastFlowRateGPM = NonNegFlow
// use injection flow as measured when not in a connection or not
bypassing
        NonNegFlow = FlowIn
        IF ( FlowIn < 5)
                NonNegFlow = 0
                BypassFlowOut = 0
        END
        IF ( GBRPDStep > 5)
                IF (GBRPDStep < 13)
                        NonNegFlow = 0
                        BypassFlowOut = 0
                END
        END
        IF ( GBRPDStep == 13)
                IF (NonNegFlow == 0)
                        NonNegFlow = 1
                        BypassFlowOut = 1
                END
        END
// the first pass through has all 0's for the outputs. Do not write this to db
        IF ( FirstCalc == 1)
                PRINT(
                "=====================================")
                PRINT(" RPD Step =  ",GBRPDStep)
                PRINT(" Flow In =  ", FlowIn)
                PRINT(" Non Neg Flow = ",NonNegFlow)
                PRINT(" Bypass Flow = ",BypassFlowOut)
                OUT_NONNEGFLOW(1, 2, 1)
                OUT_BYPASSFLOW(1, 2, 1)
                PRINT(
                "=====================================")
        ELSE
                FirstCalc = 1
        END
                SLEEP(1000)
END // End Real-Time While Loop
```

In some implementations, the selected flow rate can be determined by executing the curve fit function at different time instants. The drilling fluid pressure can vary according to the drill pipe pressure schedule over the different time instants. At each time instant of the different time instants, the computer system 106 can execute the curve fit function to determine the drilling fluid pressure that will satisfy the drill pipe pressure schedule at that time instant. For example, the computer system 106 can determine a first pressure according to the drilling pipe pressure schedule at a first time instant. The computer system 106 can identify at least one data pair that includes a flow rate of drilling fluid through the bypass piping 105 and the first pressure at the first time instant. The computer system 106 can provide the flow rate and the first pressure to the curve fit function and determine the selected flow rate at which the pressure control device 104 should release the drilling fluid to maintain the pressure at the first time instant.

Subsequently, the computer system 106 can determine a second pressure according to the drilling pipe pressure schedule at a second time instant. The computer system 106 can identify a data pair that includes a flow rate of the drilling fluid through the bypass piping 105 and the second pressure at the second time instant. The computer system 106 can provide the flow rate and the second pressure to the curve fit function and determined a modified drilling fluid flow rate at which the pressure control device 104 should release the drilling fluid to maintain the pressure at the second time instant. In this manner, the computer system 106 can implement the techniques described here over multiple time instants.

Figure 2:
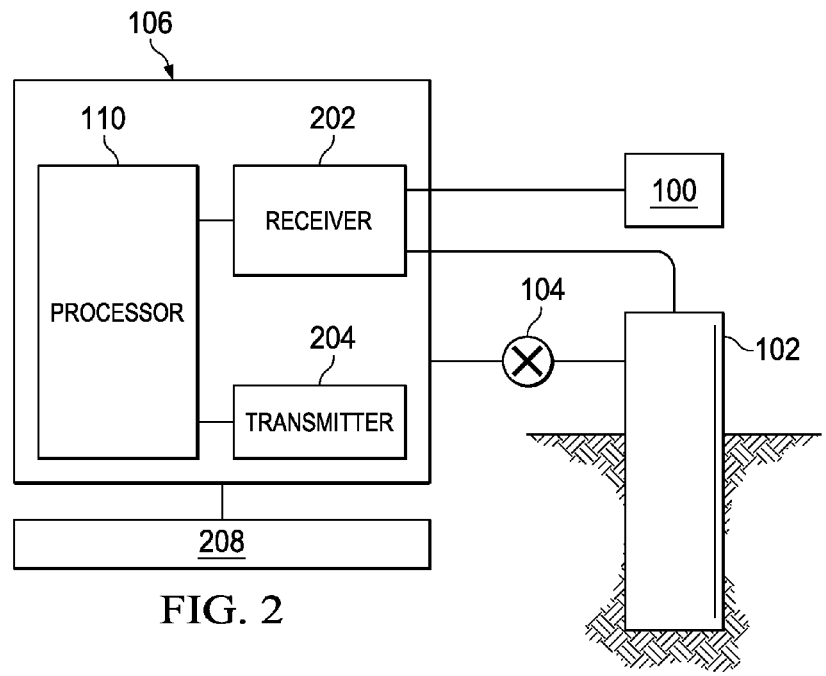
FIG. 2 is a schematic diagram of an example of the computer system to regulate drilling fluid pressure in the drilling fluid circulation system.

FIG. 2 is a schematic diagram of an example of the computer system 106 to regulate drilling fluid pressure in the drilling fluid circulation system. The computer system 106 can include a receiver 202 and a transmitter 204, each of which can be in electronic communication with the processor 110. The computer system 106 can cause the receiver 202 to receive signals from the drilling fluid circulation system 100 and the well bore 102. For example, the signals can be pressure measurement signals representative of the pressure of the drilling fluid circulated through the drilling fluid circulation system 100. The computer system 106 can include a transmitter 204 that is in electronic communication with the processor 110. The computer system 106 can cause the transmitter 204 to transmit control signals to at least partially open the pressure control device 104 to release the drilling fluid at a selected flow rate, for example, the selected flow rate determined as described above.

In some implementations, the drilling fluid circulation system 100 can include a flow meter (not shown) that is connected to the bypass piping 105 or the discharge piping 24. The flow meter can be connected to the pressure control device 104 to measure a flow rate at which the pressure control device 104 releases the drilling fluid. The computer system 106 can be connected to the flow meter to receive the flow rate measured by the flow meter. The computer system 106 can compare the flow rate measured by the flow meter to the selected flow rate determined as described above. In this manner, the computer system 106 can implement a feedback system for the selected flow rate.

Figure 3:
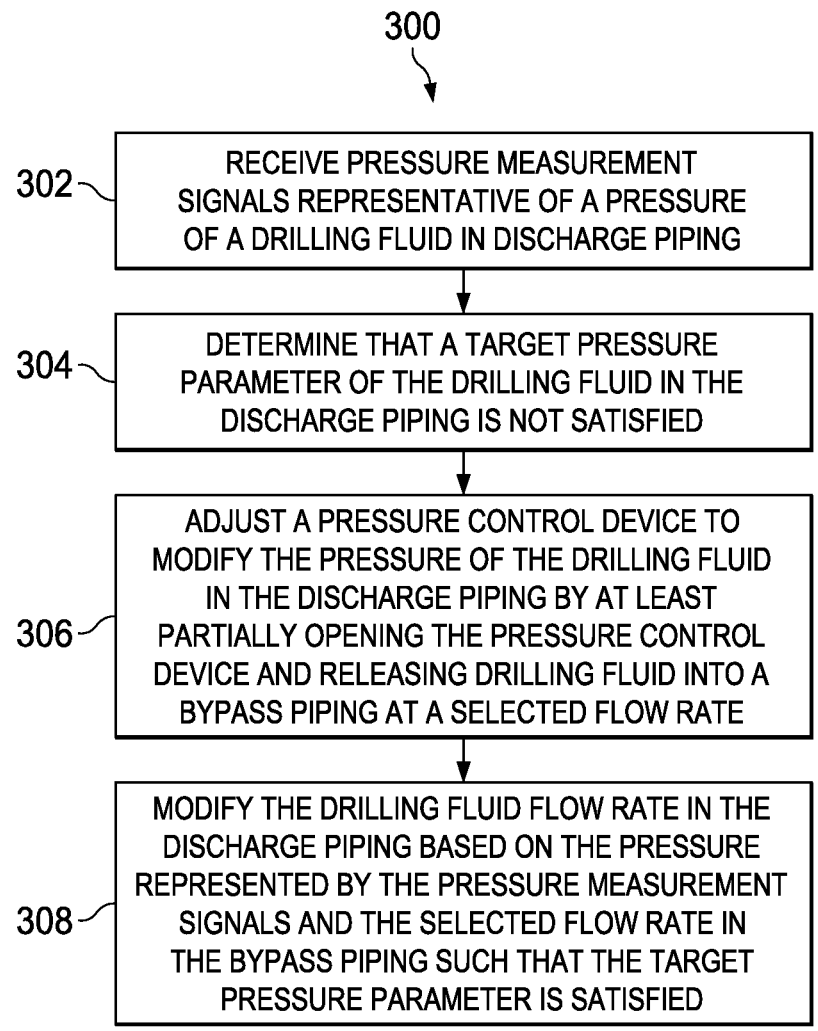
FIG. 3 is a flowchart of an example process of regulating drilling fluid pressure in the drilling fluid circulation system.

FIG. 3 is a flowchart of an example process 300 of regulating drilling fluid pressure in the drilling fluid circulation system. The process 300 can be implemented as computer-readable instructions stored on a computer-readable medium (for example, a non-transitory computer-readable medium) and executed by one or more data processing apparatus (for example, a processor). For example, the process 300 can be implemented by the computer system 106. At 302, pressure measurement signals representative of a pressure of a drilling fluid in discharge piping is received. The drilling fluid is discharged by at least one drilling fluid pump into a discharge piping at a drilling fluid flow rate. The drilling fluid pump has an inlet connected to the discharge piping and has an outlet connected to bypass piping.

At 304, it is determined that a target pressure parameter of the drilling fluid in the discharge piping is not satisfied. The target pressure parameter in the discharge piping can correspond to a drilling fluid pump rate schedule according to which the drilling fluid pump discharges the drilling fluid through the discharge piping. At 306, a pressure control device is adjusted to modify the pressure of the drilling fluid in the discharge piping to approach the target pressure parameter by at least partially opening the pressure control device and releasing drilling fluid into a bypass piping at a selected flow rate, in response to determining that the target pressure parameter is not satisfied. At 308, the drilling fluid flow rate in the discharge piping is modified based on the pressure represented by the pressure measurement signals and the selected flow rate in the bypass piping such that the target pressure parameter of the drilling fluid in the discharge piping is satisfied.

Figure 4:
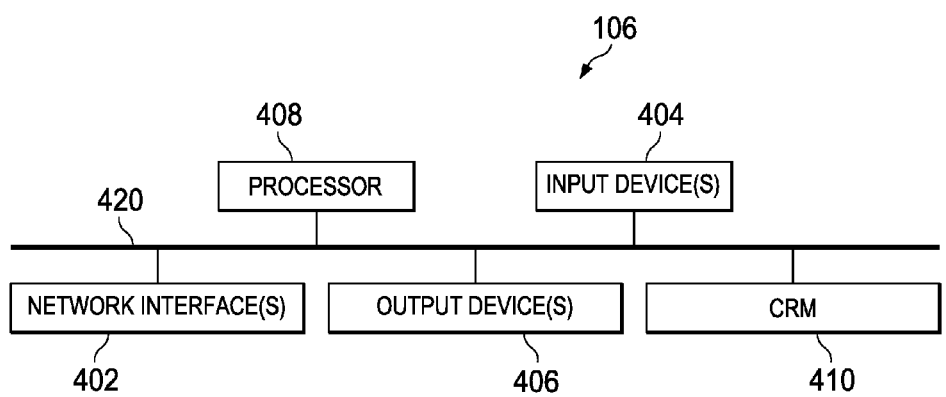
FIG. 4 is a block diagram of an example architecture of the computer system of FIG. 1.

FIG. 4 is a block diagram of an example architecture of the computer system 106 of FIG. 1. The computer system includes one or more processors 408 and a computer-readable medium 410 (for example, a non-transitory computer-readable medium) storing computer instructions executable by the one or more processors 408 to transmit well data up hole based on bandwidth. The computer system can include one or more network interfaces 402 and one or more input devices 404. The computer system can also include one or more output devices 406, for example, the display 122, and the like. The components of the computer system can be coupled by a bus 420.

A number of embodiments have been described. Nevertheless, it will be understood that various modifications may be made without departing from the spirit and scope of the disclosure. In some implementations, downhole pressure-while-drilling (PWD) data can be used to determine the pressure parameter as an alternative to or in addition to pressure in the drilling rig standpipe 26. In addition, the drilling fluid circulation system 100 and the computer system 106 can be implemented as a single system or as separate systems.

What is claimed is:

1. A computer-implemented method of killing a well, the method comprising:
    maintaining kill mud pressure in a discharge piping during a well kill operation by:
        receiving pressure measurement signals representative of a pressure of a kill mud discharged by at least one fluid pump into the discharge piping at a fluid flow rate, wherein the fluid pump has an inlet connected to the discharge piping and has an outlet connected to bypass piping;
        determining that a target pressure parameter of the kill mud in the discharge piping to kill the well is not satisfied;
        in response to determining that the target pressure parameter is not satisfied, adjusting a pressure control device to modify the pressure of the kill mud in the discharge piping to approach the target pressure parameter by at least partially opening the pressure control device and releasing kill mud into a bypass piping at a selected flow rate, wherein the pressure control device is connected at an inlet to the discharge piping and at an outlet to bypass piping;
        determining the selected flow rate at which the at least partially open pressure control device releases the kill mud by:
            identifying one or more data pairs, each data pair including a flow rate of kill mud through the bypass piping and a pressure in the bypass piping;
            providing the flow rate of kill mud through the bypass piping and the pressure in the bypass piping included in each data pair of the identified one or more data pairs as an input to a curve fit function; and
            executing the curve fit function to determine the selected flow rate at which the at least partially open pressure control device releases the kill mud; and
        modifying the kill mud flow rate in the discharge piping based on the pressure represented by the pressure measurement signals and the selected flow rate in the bypass piping such that the target pressure parameter of the kill mud in the discharge piping is satisfied.

2. The method of claim 1, wherein the method is a Driller's method.

3. The method of claim 1, wherein the method is a Wait and Weight method.

4. The method of claim 1, wherein the target pressure parameter in the discharge piping corresponds to a kill mud pipe pressure schedule according to which the fluid pump discharges the kill mud through the discharge piping, and wherein the method further comprises modifying the kill mud flow rate in the discharge piping based on the pressure represented by the pressure measurement signals and the selected flow rate to satisfy the drill pipe pressure schedule.

5. The method of claim 1, further comprising:
    identifying a subset of the plurality of data pairs;
    providing each flow rate of kill mud and each pressure in the bypass piping included in each data pair in the subset to a curve fit function; and
    executing the curve fit function to determine a modified kill mud flow rate.

6. The method of claim 1, further comprising:
    measuring a plurality of flow rates of kill mud through the bypass piping;
    measuring a plurality of pressures in the bypass piping, each pressure measured for a corresponding flow rate of the plurality of flow rates; and
    storing the plurality of flow rates and the plurality of pressures as a plurality of data pairs which include the identified one or more data pairs.

7. The method of claim 1, further comprising:
    measuring a flow rate at which the pressure relief device releases the kill mud; and
    comparing the flow rate to the selected flow rate.

8. The method of claim 1, further comprising transmitting control signals to at least partially open the pressure control device to release the kill mud at the selected flow rate.

9. The method of claim 1, further comprising measuring the kill mud flow rate through the bypass piping.

10. A system for killing a well, the system comprising:
    at least one surface fluid pump connected to discharge piping connected to an inlet of a wellbore, said pump operable to discharge kill mud through the discharge piping at a flow rate;
    a pressure control device having an inlet connected to the discharge piping and having an outlet connected to bypass piping; and
    a processor connected to the surface pump and the pressure control device, the processor operable to maintain kill mud pressure in the discharge piping during a well kill operation by:
        receiving pressure measurement signals representative of a pressure of a kill mud discharged by the pump into the discharge piping;
        determining that a target pressure parameter of the kill mud in the discharge piping to kill the well is not satisfied;
        in response to determining that the target pressure parameter is not satisfied, adjusting the pressure control device to modify the pressure of the kill mud in the discharge piping to approach the target pressure parameter by at least partially opening the pressure control device and releasing kill mud into the bypass piping at a selected flow rate;

determining the selected flow rate at which the at least partially open pressure control device releases the kill mud by:
  identifying one or more data pairs, each data pair including a flow rate of kill mud through the bypass piping and a pressure in the bypass piping;
  providing the flow rate of kill mud through the bypass piping and the pressure in the bypass piping included in each data pair of the identified one or more data pairs as an input to a curve fit function; and
  executing the curve fit function to determine the selected flow rate at which the at least partially open pressure control device releases the kill mud; and
modifying the kill mud flow rate in the discharge piping based on the pressure represented by the pressure measurement signals and the selected flow rate in the bypass piping such that the target pressure parameter of the kill mud in the discharge piping is satisfied.

11. The system of claim 10, wherein the well kill operation comprises the Driller's method.

12. The system of claim 10, wherein the well kill operation comprises the Wait and Weight method.

13. The system of claim 10, wherein the target pressure parameter in the discharge piping corresponds to a kill mud pipe pressure schedule according to which the fluid pump discharges the kill mud through the discharge piping, and wherein the processor is operable to maintain kill mud pressure in the discharge piping during a well kill operation by modifying the kill mud flow rate in the discharge piping based on the pressure represented by the pressure measurement signals and the selected flow rate to satisfy the drill pipe pressure schedule.

14. A non-transitory computer-readable medium storing instructions executable by a processor to perform operations comprising:
  maintaining kill mud pressure in a discharge piping during a well kill operation by:
    receiving pressure measurement signals representative of a pressure of a kill mud discharged by at least one fluid pump into the discharge piping at a fluid flow rate, wherein the fluid pump has an inlet connected to the discharge piping and has an outlet connected to bypass piping;
    determining that a target pressure parameter of the kill mud in the discharge piping to kill the well is not satisfied;
    in response to determining that the target pressure parameter is not satisfied, adjusting a pressure control device to modify the pressure of the kill mud in the discharge piping to approach the target pressure parameter by at least partially opening the pressure control device and releasing kill mud into a bypass piping at a selected flow rate, wherein the pressure control device is connected at an inlet to the discharge piping and at an outlet to bypass piping;
    determining the selected flow rate at which the at least partially open pressure control device releases the kill mud by:
      identifying one or more data pairs, each data pair including a flow rate of kill mud through the bypass piping and a pressure in the bypass piping;
      providing the flow rate of kill mud through the bypass piping and the pressure in the bypass piping included in each data pair of the identified one or more data pairs as an input to a curve fit function; and
      executing the curve fit function to determine the selected flow rate at which the at least partially open pressure control device releases the kill mud; and
    modifying the kill mud flow rate in the discharge piping based on the pressure represented by the pressure measurement signals and the selected flow rate in the bypass piping such that the target pressure parameter of the kill mud in the discharge piping is satisfied.

15. The medium of claim 14, wherein the operations comprise a Driller's method.

16. The medium of claim 14, wherein the operations comprise a Wait and Weight method.

* * * * *